United States Patent
Bonneau et al.

(10) Patent No.: US 9,849,995 B2
(45) Date of Patent: Dec. 26, 2017

(54) AIRCRAFT NACELLE COMPRISING A SPACING SYSTEM WHICH IS INTENDED TO MAINTAIN THE TWO COWLS SPACED APART

(71) Applicant: Airbus Operations (S.A.S.), Toulouse (FR)

(72) Inventors: Florent Bonneau, Colomiers (FR); Julien Lezerac, Fenouillet (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 343 days.

(21) Appl. No.: 14/680,701

(22) Filed: Apr. 7, 2015

(65) Prior Publication Data
US 2015/0284100 A1  Oct. 8, 2015

(30) Foreign Application Priority Data

Apr. 7, 2014  (FR) ...................................... 14 53048

(51) Int. Cl.
*B64D 29/06* (2006.01)
(52) U.S. Cl.
CPC .................... *B64D 29/06* (2013.01)
(58) Field of Classification Search
CPC ................................ B64D 29/06; B64D 29/00
USPC ........................... 244/53 R, 54; 292/144, 201
See application file for complete search history.

(56) References Cited

U.S. PATENT DOCUMENTS

| | | | |
|---|---|---|---|
| 2,031,302 A | 2/1936 | Clark | |
| 3,061,349 A | 10/1962 | Dellith | |
| 4,585,189 A * | 4/1986 | Buxton | B64D 29/00 244/129.4 |
| 6,666,408 B1 | 12/2003 | De Carvalho et al. | |
| 9,007,855 B2 * | 4/2015 | Kumar | G11C 29/022 365/193 |
| 2016/0101871 A1* | 4/2016 | Boileau | B64D 29/06 415/182.1 |

FOREIGN PATENT DOCUMENTS

EP  1 099 629 A1  5/2001

OTHER PUBLICATIONS

French Search Report for Application No. 14 53 048 dated Dec. 18, 2014.

* cited by examiner

*Primary Examiner* — Marc Burgess
*Assistant Examiner* — Magdalena Topolski
(74) *Attorney, Agent, or Firm* — Jenkins, Wilson, Taylor & Hunt, P.A.

(57) ABSTRACT

An aircraft nacelle with a system to provide spacing between two halves of a cowl. The cowls open and close by rotating about an axis in the upper regions of the cowls, and the cowls have indexing features in a region of the lower edges. The indexers are in sliding contact the spacing system, which is rigidly mounted to the nacelle. The spacing system comprises a housing for receiving the indexers and two levers with features for prescribing the movement of the cowls. The spacing system further comprises an actuator and a plurality returns to assist the movement of the cowls.

3 Claims, 5 Drawing Sheets

AIRCRAFT NACELLE COMPRISING A SPACING SYSTEM WHICH IS INTENDED TO MAINTAIN THE TWO COWLS SPACED APART

CROSS-REFERENCE TO RELATED APPLICATION

This application claims the benefit of and priority to French patent application No. 14 53048 filed on Apr. 7, 2014, the entire disclosure of which is incorporated by reference herein.

BACKGROUND

The present disclosure relates to an aircraft nacelle comprising two cowls and a spacing system which is intended to maintain the two cowls spaced apart, and an aircraft comprising at least one such nacelle.

An aircraft comprises at least one nacelle in which there is received an engine, for example, of the turbojet type, and which is suspended on a strut. The nacelle generally comprises two cowls (or fan cowls) which may be opened in order to allow the maintenance of the engine to occur.

Each cowl is articulated about an opening axis which is parallel with the longitudinal axis of the nacelle and which is arranged in the upper portion of the cowls, and the two cowls are arranged symmetrically at one side and the other of the strut.

Each cowl is thus movable between a closed position, in which the cowl is arranged in the extension of the outer surface of the nacelle so as to cover the casing of the fan, and an open position, in which an operator may access the engine.

The lower edges of the cowls, which are located in the lower portion of the nacelle, are substantially in abutment in the closed position and are maintained in that locked position by a plurality of locking systems which are distributed along the abutting lower edges of the cowls.

In order to prevent the unexpected closure of the cowls, it is known to provide a spacing system (called a "Hold Open Device" (HOD)) in the region of the lower edges of the cowls. That spacing system maintains the two cowls spaced apart and only an intentional action by a technician on the spacing system allows the two cowls to be moved together and placed in a closed position.

Current spacing systems are completely satisfactory when the cowls are sufficiently rigid. As a result of the composite materials which are used increasingly and because of the increase in the dimensions of the cowls, the cowls have a tendency to become more flexible and to become deformed more readily.

As a result of that flexibility, the lower edges of the cowls may be moved together without the technician acting on the spacing system. Therefore, there is a risk that the lower edges of the cowls may move together and the technician, seeing the two cowls in abutment, may consider the cowls to be locked.

SUMMARY

An object of the present disclosure is to provide an aircraft nacelle which comprises two cowls and a spacing system of the two cowls which does not have the disadvantages of the prior art and which particularly maintains the lower edges of the cowls spaced apart in an effective manner.

To that end, there is provided a nacelle comprising:
two cowls, each having a lower edge and an indexer in the region of the lower edge, the two cowls being mounted so as to be movable in terms of rotation about an opening axis between a closed position, in which the lower edges are in contact, and an open position, in which the lower edges are spaced apart from each other,
a spacing system comprising:
 a base which is fixed to a fixed portion of the nacelle,
 for each cowl, a lever which is independent of the lever which is associated with the other cowl and which has a housing in which the indexer is received when the corresponding cowl is in a closed position, and a stop against which the indexer is positioned when the corresponding cowl is in an open position, the lever being movable in terms of rotation on the base between an engagement position, in which the indexer is in the housing or against the stop, and a disengagement position, in which the lever is retracted in order to allow the movement of the indexer from the housing toward the stop, and vice versa, and
 for each lever, a return which is intended to urge the lever into the engagement position.

Such a spacing system prevents the cowls from moving together if a technician does not intervene directly in the spacing system.

BRIEF DESCRIPTION OF THE DRAWINGS

The features of the disclosure herein mentioned above and others will be appreciated more clearly from a reading of the following description of an embodiment, the description being given with reference to the appended drawings, in which.

DETAILED DESCRIPTION

Figure 1:
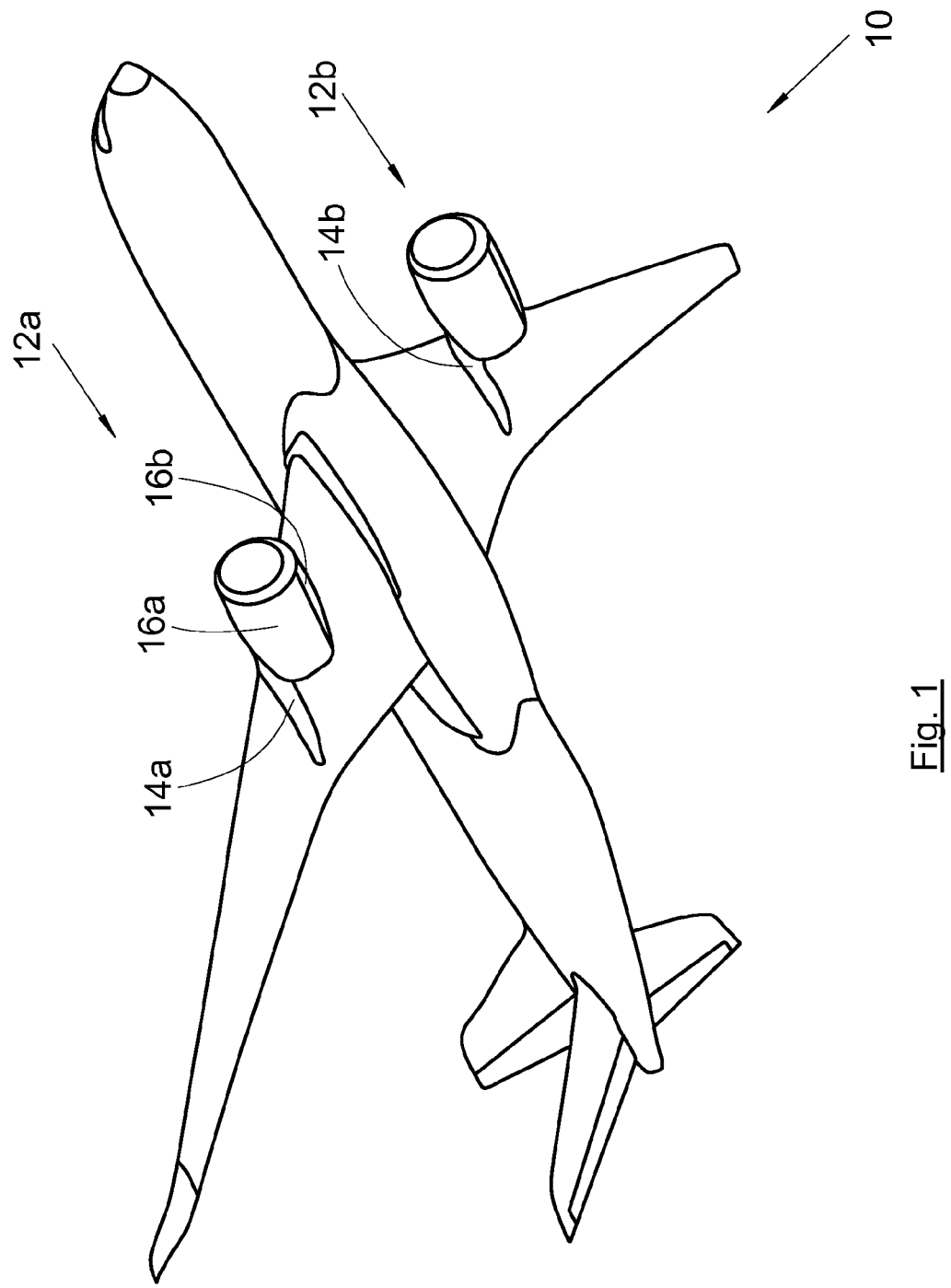
FIG. 1 shows an aircraft according to the disclosure herein.

FIG. 1 shows an aircraft 10 which comprises two nacelles 12a-b which are of substantially cylindrical form. Each nacelle 12a-b is fixed below a strut 14a-b of the aircraft 10 and comprises two cowls 16a-b which are mounted so as to be movable in terms of rotation at one side and the other of the strut 14a-b about an opening axis which is parallel with the longitudinal axis of the nacelle 12a-b.

The lower edges of the cowls 16a-b move into contact when the cowls 16a-b are in a closed position and move away from each other when the cowls 16a-b are in an open position.

Each cowl 16a-b comprises, in the region of the lower edge thereof, an indexer 18 for providing an approach for indexing.

FIGS. 2 to 7 show a spacing system 100 in different operating positions. In FIGS. 2 to 6, only half of the spacing system has been illustrated, but it is symmetrical in relation to the axis of symmetry 20. In the description of FIGS. 1 to 6, therefore, reference has only been made to the right portion of the nacelle 12a, but the left portion is identical.

The spacing system 100 comprises a base 102 which is fixed to a fixed portion of the nacelle 12a, for example, fixed to the rear wall of the air inlet of the nacelle.

For each cowl 16a-b, the spacing system 100 comprises a lever 104 which has a housing 108, in which the indexer 18 is received when the corresponding cowl 16a-b is in a closed position, and a stop 110, against which the indexer 18 is positioned when the corresponding cowl 16a-b is in an open position in order to prevent it from being closed.

The lever 104 is provided to be movable in terms of rotation on the base 102 between an engagement position which corresponds to the fact that the indexer 18 is positioned in the housing 108 or against the stop 110, and a disengagement position which involves retraction of the lever 104 in order to allow the movement of the indexer 18 from the housing 108 toward the stop 110, and vice versa.

The rotation on the base 102 is carried out about a rotation axle 106 which is parallel with the opening axis.

The spacing system 100 also comprises for each lever 104 a return which urges the lever 104 into the engagement position and beyond in relation to the disengagement position. The return is, for example, a spring which is mounted on the rotation axle 106.

Figure 2:
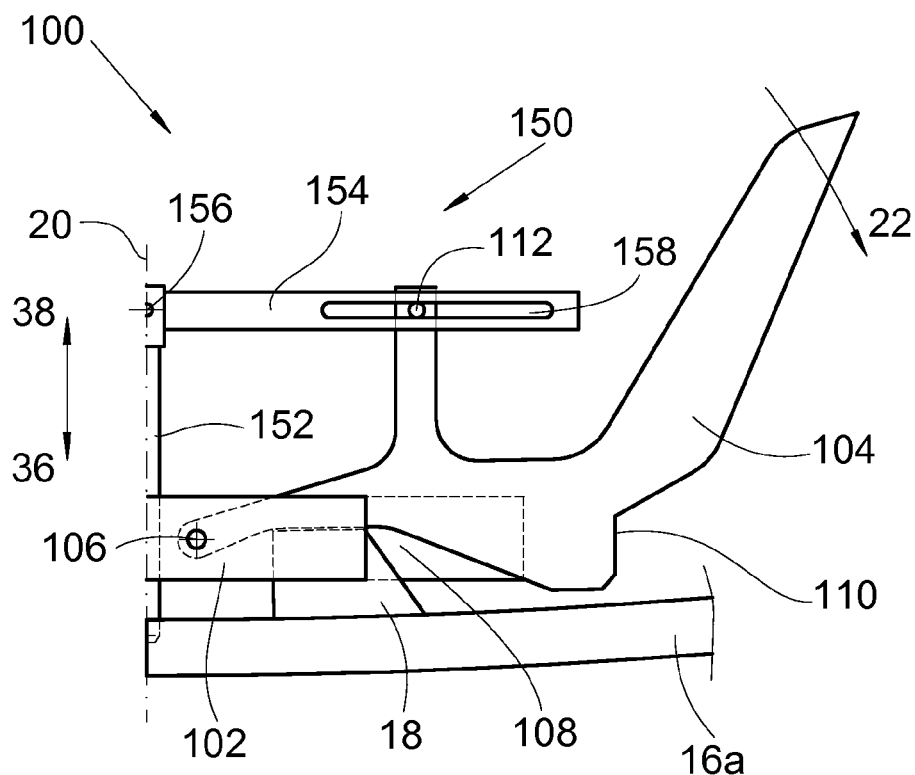
FIGS. 2 to 7 show a spacing system according to the disclosure herein in different positions.

FIG. 2 corresponds to the closed position of the cowls 16a-b. The indexer 18 is in the housing 108 and the spacing system 100 is in the engagement position.

Figure 5:
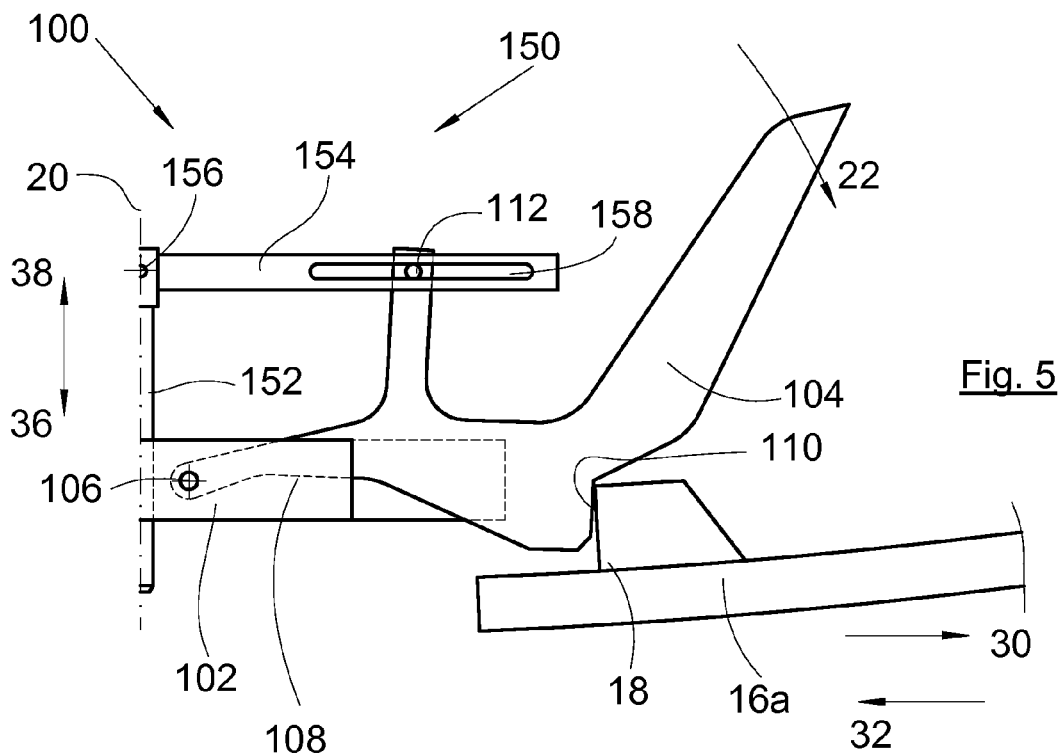

FIG. 5 corresponds to the open position of the cowls 16a-b. The indexer 18 is against the stop 110 and the spacing system 100 is in the engagement position.

Figure 4:
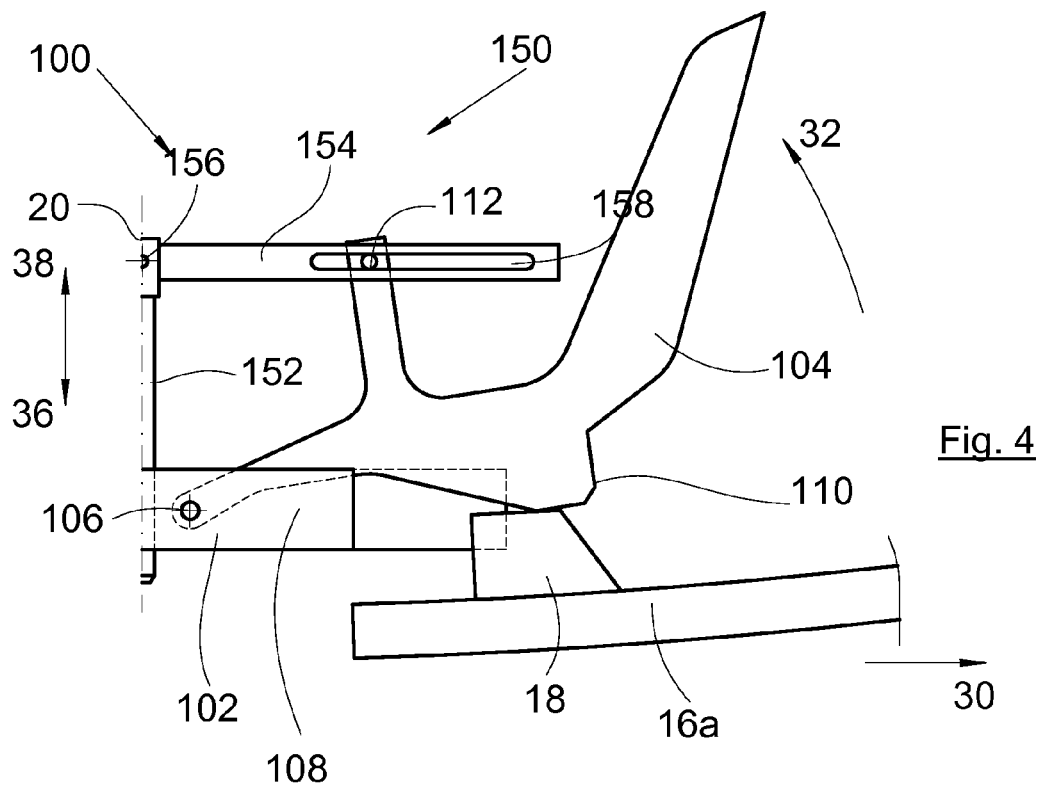

FIG. 4 corresponds to the disengagement position of the spacing system 100 where the indexer is free to move from the housing 108 to the stop 110 and vice versa.

Figure 3:
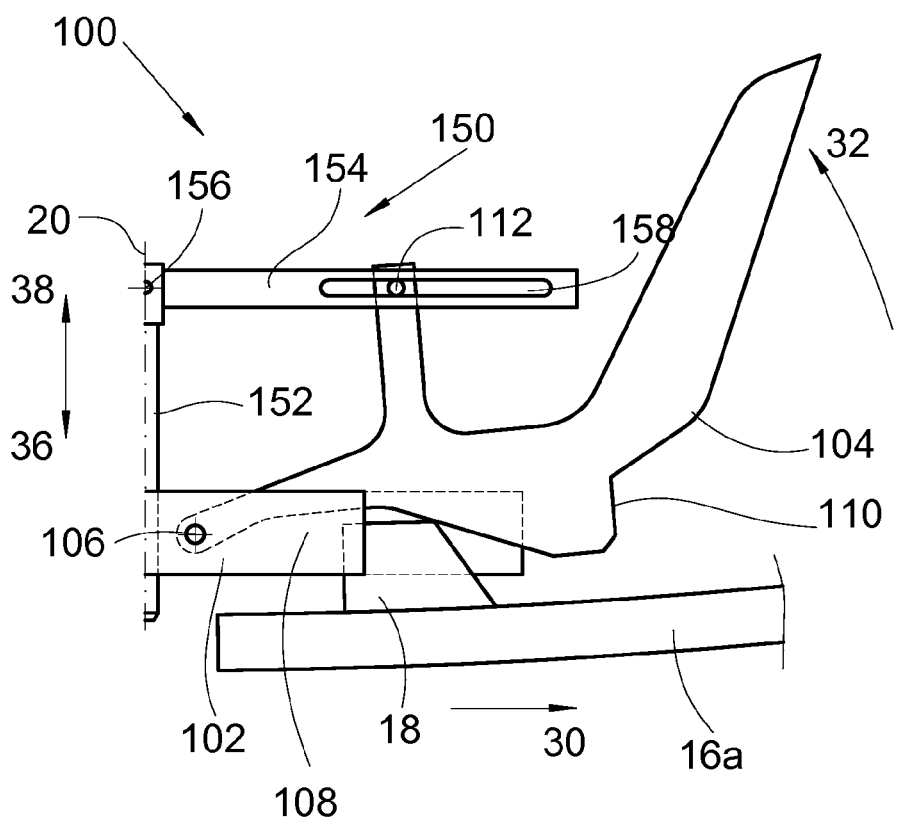

FIG. 3 corresponds to an intermediate position between the engagement position and the disengagement position.

Figure 6:
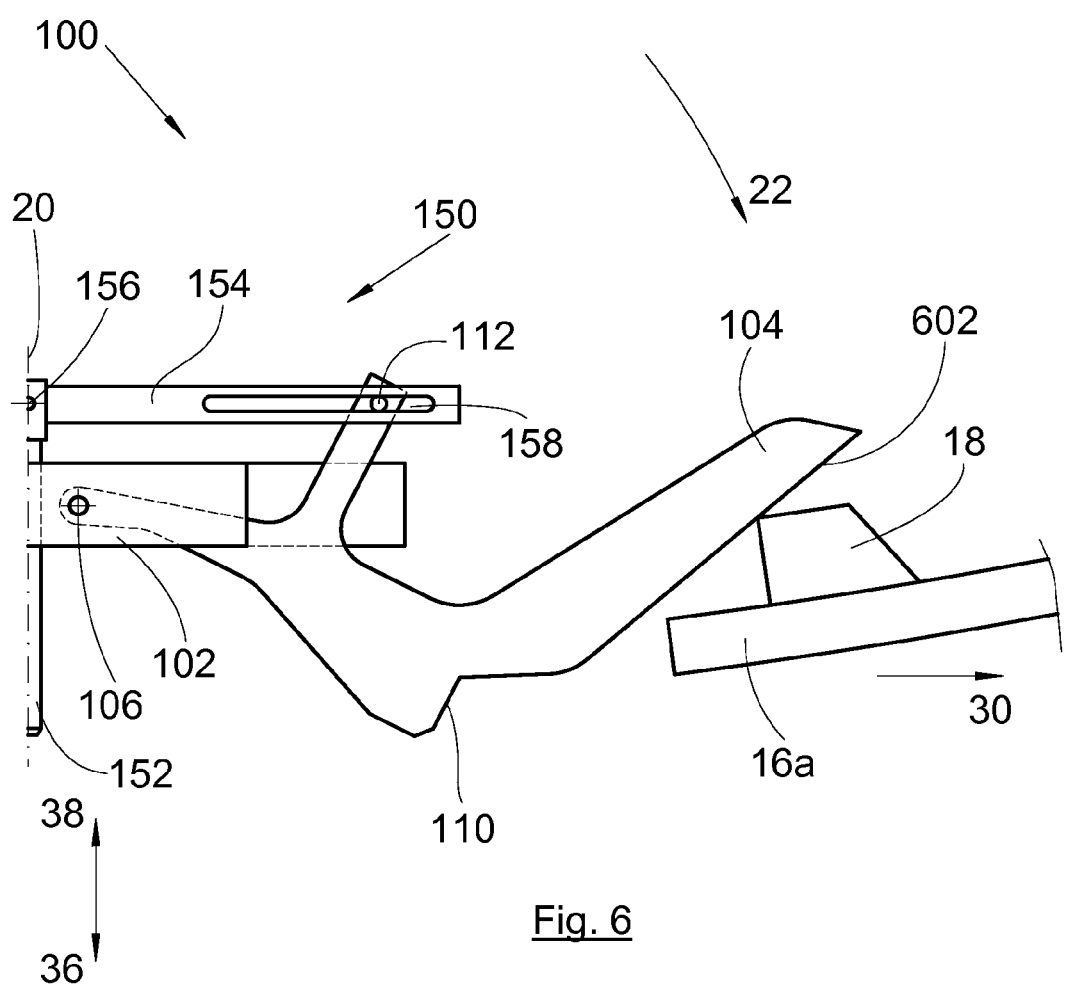

FIG. 6 corresponds to a completely open position of the cowls 16a-b where the indexer 18 is beyond the stop 110.

The positioning of the indexer 18 in the housing 108 and the positioning of the lever 104 in the engagement position correspond to the closed position of the cowl 16a-b.

The positioning of the indexer 18 against the stop 110 and the positioning of the lever 104 in the engagement position correspond to the open and spaced-apart position of the cowl 16a-b.

The lever 104 of one of the cowls 16a-b is independent of the lever 104 of the other cowl 16b-a.

The spacing system 100 also comprises one or more actuator 150 which is common to the two levers 104 and provided to be actuated by a technician and to authorize the movement of each lever 104 from the engagement position to the disengagement position, and thereby to authorize the movement of the indexer 18 from the stop 110 toward the housing 108 and thus the movement of the cowl 16a-b from the open position to the closed position thereof.

In the engagement position, when the indexer 18 is in abutment against the stop 110, the lever 104 is provided to prevent the movement of the indexer 18 toward the housing 108 and therefore the movement of the associated cowl 16a-b from the open position to the closed position without being urged by the technician.

Operation of the spacing system 100 will now be described on the basis of the closed position of the cowls 16a-b.

In FIG. 2, the lever 104 is urged (arrow 22) by the return into the engagement position and the cowls 16a-b are closed.

In FIG. 3, the cowls 16a-b open (arrow 30). The indexer 18 slides against a wall of the housing 108, which wall is provided for this purpose, under the lever 104 and the lever 104 rises (arrow 32) by rotation in order to allow the indexer 18 to pass progressively.

In FIG. 4, the indexer 18 progressively leaves the housing 108 and continues to lift the lever 104.

In FIG. 5, the indexer 18 has left the housing 108 and the return lowers the lever 104 (arrow 22). The indexer 18 is then positioned against the stop 110, which prevents the indexer 18 from lifting the lever 104 in order to move back into the housing 108.

If the cowl 16a-b attempts to close again (arrow 34, FIG. 5) without any intervention by the technician, the indexer 18 applies to the stop 110 a pressure which brings about a rotation of the lever 104 in the direction of a lowering action (arrow 22) of the lever 104, that is to say, a displacement beyond the engagement position in relation to the disengagement position. Such a lowering action prevents the movement of the indexer 18 under the lever 104 in order to reach the housing 108.

Even when the cowl 16a-b is flexible, its non-authorized closure is thereby impossible.

Operation of the spacing system 100 will now be described on the basis of the open position of the cowls 16a-b.

In FIG. 5, the indexer 18 is in abutment against the stop 110.

The action of the technician on the actuator 150 brings about the movement of the lever 104 from the engagement position (FIG. 5) to the disengagement position (FIG. 4).

In FIG. 4, the indexer 18 moves freely from the position against the stop 110 to the position in the housing 108 (FIG. 3).

After the actuator 150 has been released, the lever 104 moves back into an engagement position under the effect of the return and with the indexer 18 in the housing 104 (FIG. 2).

In FIG. 6, the cowl 16a continues to open (arrow 30) and the lever 104 thus continues to be lowered (arrow 22) under the effect of the return.

In order to prevent any contact between the lever 104 and the lower edge of the cowl 16a-b during this continued opening action, that is to say, when the indexer 18 is beyond the stop 110 in relation to the housing 108, the lever 104 has an extension 602 (visible in FIG. 7), against which the indexer 18 slides during the movement thereof. The extension 602 is a plane in this instance.

The actuator 150 comprises a rod 152 which is movable in terms of translation (arrows 36 and 38) on the base 102 and a beam 154 which is mounted on the rod 152.

One of the ends of the beam 154 forms with one of the levers 104 a rectilinear linear connection (cylinder/plane) having an axis parallel with the opening axis and the other end of the beam 154 forms with the other lever 104 a rectilinear linear connection (cylinder/plane) having an axis parallel with the opening axis.

To that end, each end has an oblong hole 158 and the lever 104 has a stud 112 which is arranged in the oblong hole 158.

Operation of the actuator 150 is as follows.

When the lever 104 is moved, the rectilinear linear connection allows the movement of the stud 112, and therefore of the lever 104, in relation to the beam 154.

From the closed position of the cowls 16a-b, the movement of the lever 104 from the engagement position (FIG. 2) toward the disengagement position (FIG. 4) brings about the movement of the rod 152 in the direction 38. The movement of the lever 104 from the disengagement position (FIG. 4) toward the engagement position (FIG. 2 or FIG. 5) brings about the movement of the rod 152 in the direction 36.

From the open position (FIG. 5) of the cowls 16a-b, the technician pushes the rod 152 in the direction 38 which tends to cause each lever 104 to move from the engagement position (FIG. 5) to the disengagement position (FIG. 4), lifting each lever 104, and thereby to allow the movement of the indexer 18 from the position in abutment against the stop 110 toward the position in the housing 108.

After the rod 152 is released, each return brings about the movement of each lever 104 toward the engagement position (FIG. 2) and therefore the movement of the rod 152 in the direction 36.

Figure 7:
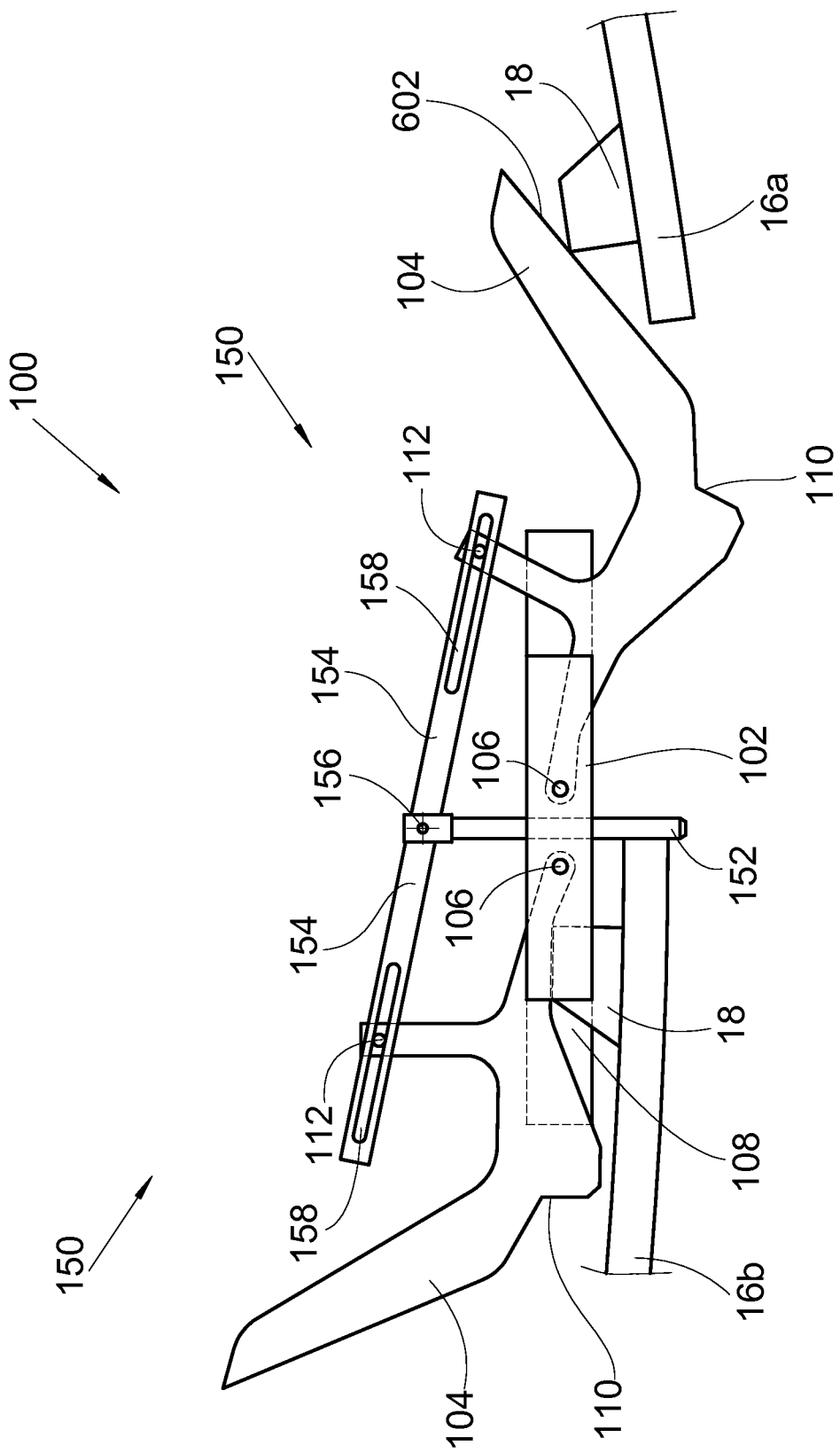

FIG. 7 shows the independence of the lever which is associated with one of the cowls 16a and the lever which is associated with the other cowl 16b.

The beam 154 is mounted so as to be movable in terms of rotation on the rod 152 about a rotation axle 156 which is parallel with the opening axis. Thus, one of the cowls 16a may be in an open position while the other cowl 16b may be in a closed position, since each lever 104 may have, along the beam 154, a position which is independent of that of the other lever 104.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle comprising:
   two cowls arranged symmetrically about an opening axis, each cowl comprising:
      an upper region and a lower region, and
      an indexer disposed in the lower region,
      wherein the opening axis is disposed in the upper region of each cowl, and the cowls are configured to be rotatable about the opening axis such that the lower regions contact with each other in a closed position and are spaced apart from each other in an open position, and
   a spacing system comprising:
      a base which is attached to the nacelle,
      a lever for each cowl, wherein each lever is rotatable about the base between an engagement position, in which the indexer is in the housing or against a stop, and a disengagement position, in which the lever is retracted in order to allow the movement of the indexer,
      a housing in which the indexers are received when the corresponding cowl is in the closed position,
      the stop disposed on each lever and against which each indexer is positioned when the corresponding cowl is in the open position,
      a return for each lever and which is configured to urge each lever into the engagement position,
      an actuator which is common to the two levers and whose actuation allows movement of each lever from the engagement position to the disengagement position,
   wherein the levers can be positioned independently from one another, and
   wherein each lever has an extension on which the indexer slides when the indexer is beyond the stop in relation to the housing.

2. The nacelle according to claim 1, wherein the actuator comprises:
   a rod which is movable in translation with respect the base, and
   a beam which is rotatably mounted on the rod about an axis parallel to the opening axis,
   wherein each end of the beam comprises a region that forms a linear translation connection to one of the levers.

3. An aircraft comprising:
   a strut, and
   a nacelle fixed under the strut, wherein the nacelle comprises:
      two cowls arranged symmetrically about an opening axis, each cowl comprising:
         an upper region and a lower region, and
         an indexer disposed in the lower region,
         wherein the opening axis is disposed in the upper region of each cowl, and the cowls are configured to be rotatable about the opening axis such that the lower regions contact with each other in a closed position and are spaced apart from each other in an open position, and
      a spacing system comprising:
         a base which is attached to the nacelle,
         a lever for each cowl, wherein each lever is rotatable about the base between an engagement position, in which the indexer is in the housing or against a stop, and a disengagement position, in which the lever is retracted in order to allow the movement of the indexer,
         a housing in which the indexers are received when the corresponding cowl is in the closed position,
         the stop disposed on each lever and against which each indexer is positioned when the corresponding cowl is in the open position,
         a return for each lever which is configured to urge each lever into the engagement position,
         an actuator which is common to the two levers and whose actuation allows movement of each lever from the engagement position to the disengagement position,
      wherein the levers can be positioned independently from one another, and wherein each lever has an extension on which the indexer slides when the indexer is beyond the stop in relation to the housing.

* * * * *